(12) United States Patent
Schmitz et al.

(10) Patent No.: US 9,017,215 B2
(45) Date of Patent: Apr. 28, 2015

(54) BELT DRIVE ARRANGEMENT FOR AN AUXILIARY UNIT OF A MOTOR VEHICLE, MOTOR VEHICLE, AND METHOD FOR OPERATING AN AUXILIARY UNIT OF A MOTOR VEHICLE

(75) Inventors: Herbert Schmitz, Wiesbaden (DE); Georg Zwickler, Taunusstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 518 days.

(21) Appl. No.: 13/364,447

(22) Filed: Feb. 2, 2012

(65) Prior Publication Data

US 2012/0202631 A1  Aug. 9, 2012

(30) Foreign Application Priority Data

Feb. 3, 2011 (DE) .......................... 10 2011 010 284

(51) Int. Cl.
*F16H 61/662* (2006.01)
*F16H 7/02* (2006.01)
*F16D 27/02* (2006.01)
*F16D 27/112* (2006.01)
*B60K 25/02* (2006.01)
*B60K 25/00* (2006.01)

(52) U.S. Cl.
CPC .............. *F16D 27/112* (2013.01); *B60K 25/00* (2013.01); *B60K 25/02* (2013.01); *B60Y 2400/404* (2013.01); *B60Y 2400/424* (2013.01)

(58) Field of Classification Search
CPC ... F16H 61/662; F16H 7/02; F16D 2027/007; F16D 27/02; F16D 27/08
See application file for complete search history.

(56) References Cited

U.S. PATENT DOCUMENTS

| 5,372,106 A | 12/1994 | Botterill |
| 7,028,794 B2 * | 4/2006 | Odahara et al. ............ 180/65.25 |
| 7,726,275 B2 * | 6/2010 | Deniston et al. .......... 123/198 R |

FOREIGN PATENT DOCUMENTS

| DE | 4243777 A1 | 7/1994 |
| DE | 20000343 U1 | 3/2000 |
| DE | 10161700 A1 | 6/2003 |
| DE | 69917228 T2 | 9/2004 |
| DE | 102005048075 A1 | 4/2007 |
| DE | 102008023834 A1 | 1/2009 |
| EP | 1274937 A1 | 1/2003 |
| WO | 9937933 A1 | 7/1999 |

OTHER PUBLICATIONS

German Patent Office, German Search Report dated Jan. 20, 2012 for German Application No. 102011010284.1.

* cited by examiner

*Primary Examiner* — Erin D Bishop
*Assistant Examiner* — Huan Le
(74) *Attorney, Agent, or Firm* — Ingrassia Fisher & Lorenz PC

(57) ABSTRACT

A belt drive arrangement for an auxiliary unit of a motor vehicle includes, but is not limited to a belt pulley for receiving a drive belt, a shaft of the auxiliary unit that can be driven with the torque of the belt pulley, and a clutch device for the releasable torque transmission between the belt pulley and the shaft of the auxiliary unit. The clutch device includes, but is not limited to an electromagnet and a spring element. The spring element is preloaded in such a manner that the clutch in a currentless state of the electromagnet is closed.

13 Claims, 3 Drawing Sheets

BELT DRIVE ARRANGEMENT FOR AN AUXILIARY UNIT OF A MOTOR VEHICLE, MOTOR VEHICLE, AND METHOD FOR OPERATING AN AUXILIARY UNIT OF A MOTOR VEHICLE

CROSS-REFERENCE TO RELATED APPLICATION

This application claims priority to German Patent Application No. 102011010284.1, filed Feb. 3, 2011, and incorporated herein by reference in its entirety.

TECHNICAL FIELD

The technical field relates to a belt drive arrangement for an auxiliary unit of a motor vehicle, for example to a coolant pump or an air-conditioning compressor. Furthermore, the technical field relates to a motor vehicle having such a belt drive arrangement and a method for operating an auxiliary unit of a motor vehicle.

BACKGROUND

From DE 699 17 228 T2 a belt pulley with electromagnetic clutch is known, which comprises an elastic spring element that acts in axial direction in such a manner that the clutch is preloaded to an engagement release position.

At least one object is to provide a belt drive arrangement for an auxiliary unit of a motor vehicle which makes possible a decoupling of the auxiliary unit, i.e., an interruption of the torque transmission to the auxiliary unit, but which is particularly sturdy and not very susceptible to wear at the same time. At least another object is to provide a method for operating an auxiliary unit of a motor vehicle is to make possible a reduction of $CO_2$ emissions.

SUMMARY

A belt drive arrangement is provided for an auxiliary unit of a motor vehicle that comprises a belt pulley for receiving a drive belt, a shaft of the auxiliary unit that can be driven with the torque of the belt pulley and a clutch device for the releasable torque transmission between the belt pulley and the shaft of the auxiliary unit. The clutch device comprises an electromagnet and a spring element. The spring element is preloaded in such a manner that the clutch in a currentless state of the electromagnet is closed.

In an embodiment, the belt drive arrangement comprises a fastening block that connects to the auxiliary unit in a rotation-proof manner. The belt pulley and the spring element are rotatably mounted to the fastening block with a first bearing and by means of a second bearing respectively. In an embodiment, the spring element is designed as spring plate that is concentrically arranged about the shaft. In an embodiment, the clutch device comprises a clutch plate, which is arranged concentrically about the shaft.

In an embodiment, the clutch plate is arranged in axial direction between the electromagnet and a friction surface connected to the belt pulley. Here, axial direction is to mean a direction that is parallel to the axis of rotation or symmetry of the belt pulley and further components as well as to the longitudinal axis of the shaft.

In an embodiment, a switching gap stands open between the electromagnet and the clutch plate in a currentless state of the electromagnet. In particular, the clutch plate through the preloading force of the spring element is pressed against a friction lining connected to the belt pulley with a clutch surface facing away from the electromagnet in a currentless state of the electromagnet.

In an embodiment, the clutch plate is positively connected to the shaft. The positive connection in this case can be realized for example by means of a flattened region of the shaft and a corresponding flattened region of a bushing connected to the clutch plate, which encloses the shaft. Such a two-flat connection brings about a positive inter-engagement and thus makes possible the transmission of torque between the bushing and the shaft.

According to an embodiment, the belt drive arrangement comprises a central screw that secures the clutch device on one end of the shaft. Here, the clutch device is merely secured against running off the shaft. Alternatively, the fastening of the clutch device can also be affected in another manner. With the design of this belt drive arrangement it is not necessary to take into account all tolerances of the overall assembly of auxiliary unit and belt pulley. In order to ensure with a clutch device preloaded by means of a spring element that the clutch in its one operating state is securely closed and in its other operating state securely opened, all tolerances of the assembly of auxiliary unit and belt pulley have to be typically included in the calculation of the spring force and the force to be exerted by the electromagnet. In the result, the spring force is therefore mostly over dimensioned for safety reasons, so that harmful axial forces continuously act on the bearings and increase wear effects.

Through the described preloading of the spring element, however, which holds the clutch device closed in the currentless state of the electromagnet, a very precisely defined switching gap is achieved. Because of this it is possible to adapt the preloading force of the spring also very precisely to the requirement and avoid over dimensioning. This also simplifies the assembly of the belt drive arrangement. Precise checking and measurement of the switching gap is no longer necessary and it no longer has to be subsequently adjusted with a number of shims.

According to an embodiment, a motor vehicle is provided with the described belt arrangement. The belt pulley is connected by a drive belt to the crankshaft of a drive of the motor vehicle. The drive can, for example, be a combustion engine or an electric motor or hybrid motor. In an embodiment, the auxiliary unit is designed as coolant pump, as air-conditioning compressor and/or as electric generator. A plurality of auxiliary units can also be provided with the belt drive arrangement. In the case of the vehicle, a fuel saving is made possible in that the auxiliary units are only supplied with torque when required. Thus, for example during a cold start of the motor vehicle, the circulation of coolant can be omitted for example in that the coolant pump is decoupled.

According to a further embodiment, a method for operating an auxiliary unit of a motor vehicle is stated. A torque is transmitted to the auxiliary unit from a drive of the motor vehicle via a belt drive arrangement having a clutch device for the releasable torque transmission. The method in this case comprises determining a requirement of torque for the auxiliary unit and the decoupling of the auxiliary unit when there is no torque requirement for the auxiliary unit or the coupling-up of the auxiliary unit when there is a need for torque for the auxiliary unit. Here, the decoupling is effected by supplying current to an electromagnet that opens the clutch device against the preloading force of a spring element, and the coupling-up is affected by switching the electromagnet currentless and closing the clutch device by means of the preloading force of the spring element. Here, the auxiliary unit is for example embodied as coolant pump, as air-conditioning compressor and/or as electric generator. In an embodiment of the method, the auxiliary unit is decoupled upon a cold start of the motor vehicle.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
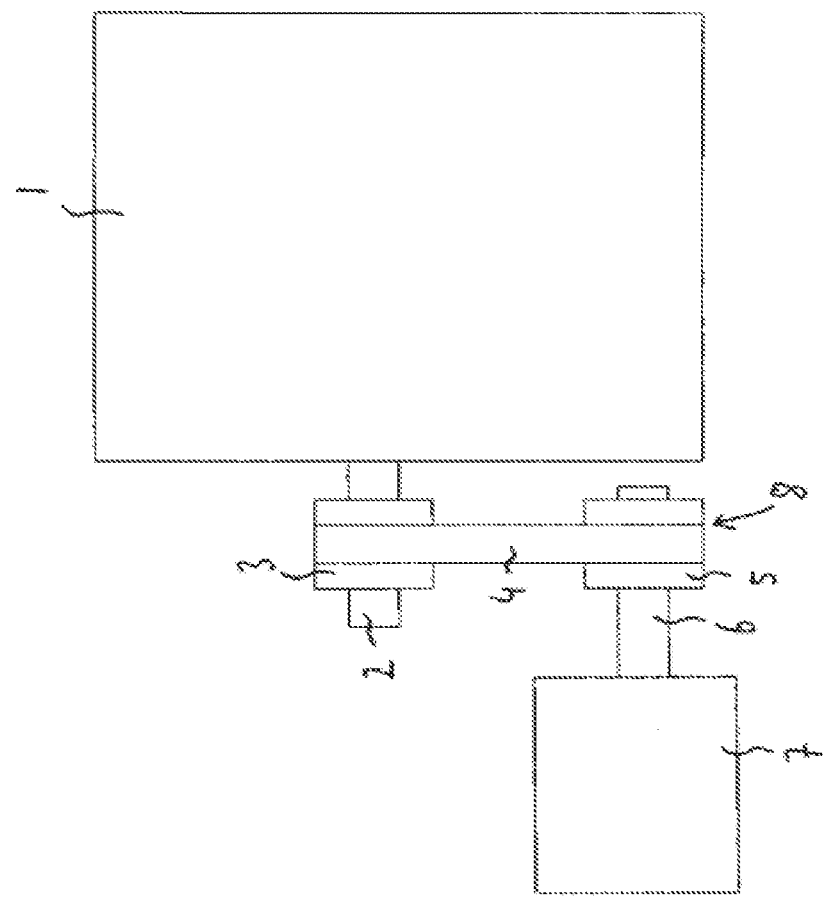
FIG. 1 is schematically shows a device for transmitting a torque from a combustion engine to an auxiliary unit by means of a belt drive arrangement.

FIG. 1 shows a combustion engine 1 of a motor vehicle with a crankshaft 2. It furthermore shows an auxiliary unit 7, which in the embodiment shown is embodied as water pump and to which torque of the combustion engine 1 is transmitted by means of a belt drive arrangement 8. To this end, a drive wheel 3 is arranged on the crankshaft 2, which via a drive belt 4 is connected to an output wheel 5, which is arranged on a shaft 6 of the auxiliary unit 7.

Figure 2:
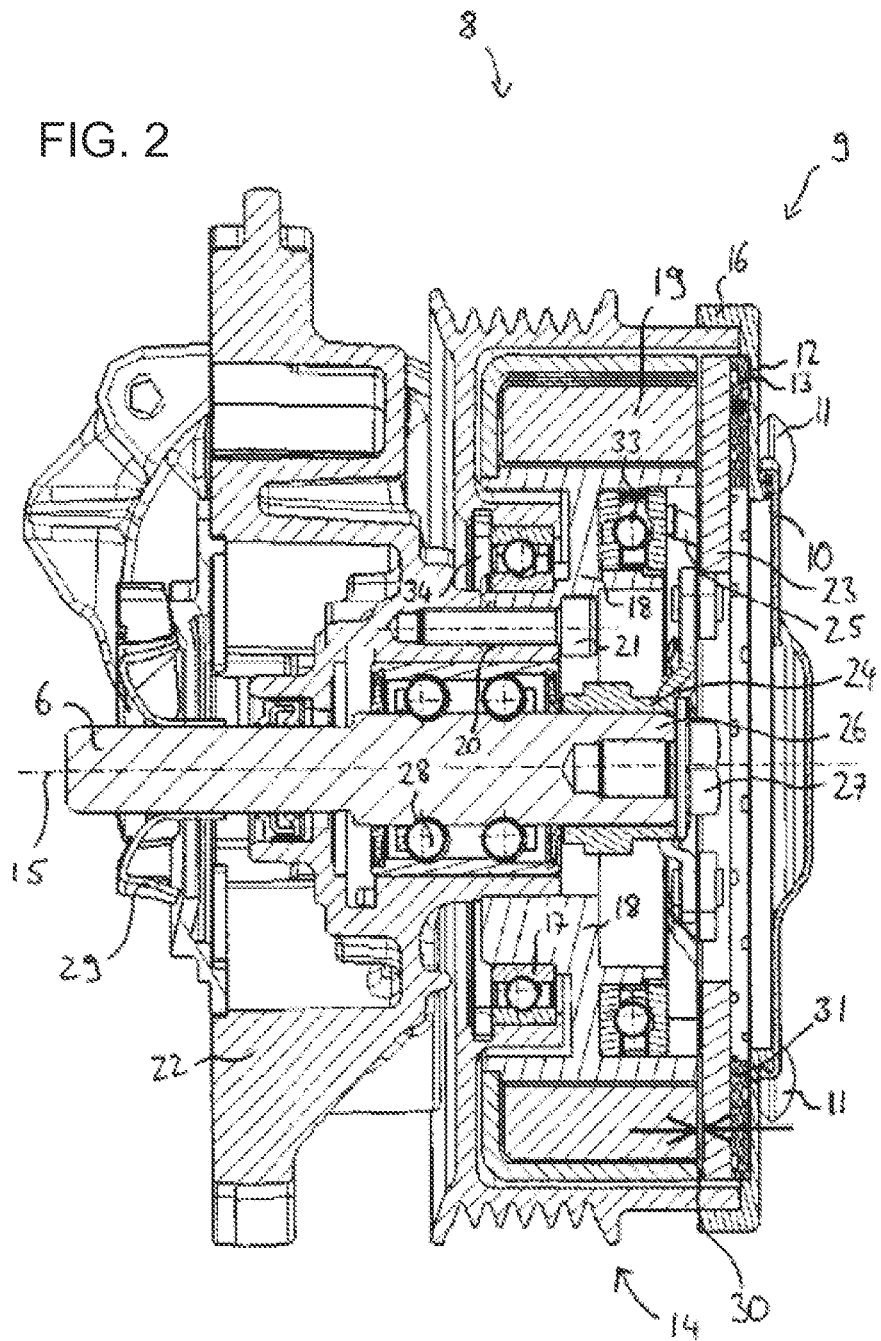
FIG. 2 is schematically shows a section through a belt drive arrangement according to an embodiment of the invention.

FIG. 2 shows a section through a belt drive arrangement 8 according to an embodiment, which comprises a clutch device 9, by means of which the torque transmission between the output wheel 5 and the shaft 6 of the auxiliary unit 7 can be interrupted and restored again. With the "assembly belt pulley", the belt drive arrangement 8 comprises the belt pulley 14, which in the shown embodiment is designed for receiving a ribbed V-belt. Furthermore, it comprises the covering 10, the ring cap 12 and the friction lining 13 bearing against an inners side of the ring cap 12, which are interconnected by a number of fastening clips 11. The ring cap 12 in the shown embodiment is pressed on, but can also be fastened in another manner.

The belt pulley 14 is substantially designed as hollow cylinder whose longitudinal axis 15 in FIG. 2 follows a horizontal course and coincides with the longitudinal axis of the shaft 6. The longitudinal axis 15 is also the axis of rotation of the shaft 6 and of the belt pulley 14. The covering 10 and the ring cap 12 enclose an end of the shaft 6. The covering 10 can be snapped onto the ring cap 12 or be put over the latter. In its outer region 16, the ring cap 12 is connected to the belt pulley 14 in a fixed manner. The belt pulley 14 is mounted on a fastening block 18 by means of a ball bearing 17 arranged adjacent to a locking ring 34, so that the belt pulley 14 can freely rotate about the longitudinal axis 15.

In addition to the fastening block 18, the assembly fastening block comprises the electromagnet 19, which is received in a corresponding shell of the fastening block 18. The fastening block 18 altogether comprises three through-holes 20 arranged evenly distributed over its circumference for receiving screws 21. The fastening block 18 is connected to the housing 22 of the coolant pump by means of the screws 21.

The clutch device 9 is enclosed by the belt pulley 14, the covering 10, and the ring cap 12. The clutch device 9 comprises the friction lining 13 of the ring cap 12, the assembly clutch plate with the substantially ring-shaped clutch plate 23 and the bushing 24 connected to the clutch plate 23 as well as the spring plate 25.

The bushing 24 encloses and end portion 26 of the shaft 6 and is connected to the latter in a rotation-proof manner, for example by means of a two-flat connection. The bushing 24 thus drives the shaft 6 and transmits torque to said shaft. In the region of the end portion 26, the bushing 24 is only secured against running off by means of a central screw 27, otherwise it is mounted on the shaft 6 displaceably in axis direction to a limited degree.

The spring plate 25 is mounted on the fastening block 18 by means of a ball bearing 33. Instead of the ball bearing 33, a slide bearing can also be employed for example. In the closed operating state of the clutch device 9, the spring plate 25 can thus be rotated about the longitudinal axis 15 together with the clutch plate 23 and the belt pulley 14. The shaft 6 is rotatably mounted in the housing 22 by means of a ball bearing 28 and carries a rotor 29 of the coolant pump.

In FIG. 2, the clutch device 9 is shown in the closed operating state, in which a torque transmission from the belt pulley 14 to the shaft 6 takes place. In this operating state, in which the electromagnet 19 is currentless, the clutch plate 23 on its coupling surface 31 is pressed against the friction lining 13, so that a frictional connection is created. The pressure force required for this is exerted by the spring plate 25 that is preloaded in such a manner that it presses the clutch plate 23 onto the friction lining 13.

In this operating state of the clutch device 9, a gaping switching gap 30 is open between the electromagnet 19 and clutch plate 23 that for example is 0.3 to 0.8 mm wide. In operation, the clutch device 9 can be opened or closed dependent on torque requirement of the coolant pump. It can be provided, in particular, that during a cold start of the combustion engine 1, the clutch device 9 is opened in order to save fuel through the non-circulation of coolant in the coolant circuit of the motor vehicle and thus reduce the emission of $CO_2$. To this end, by supplying the electromagnet 19 with current the switching gap 30 is closed in that the clutch plate 23 serving as armature is pulled against the electromagnet 19. Because of this, the clutch plate 23 is pulled off the friction lining 13 and the frictional connection is released. Thus, the clutch device 9 is opened and a transmission of torque from the belt pulley 14 to the shaft 6 is interrupted.

Figure 3:
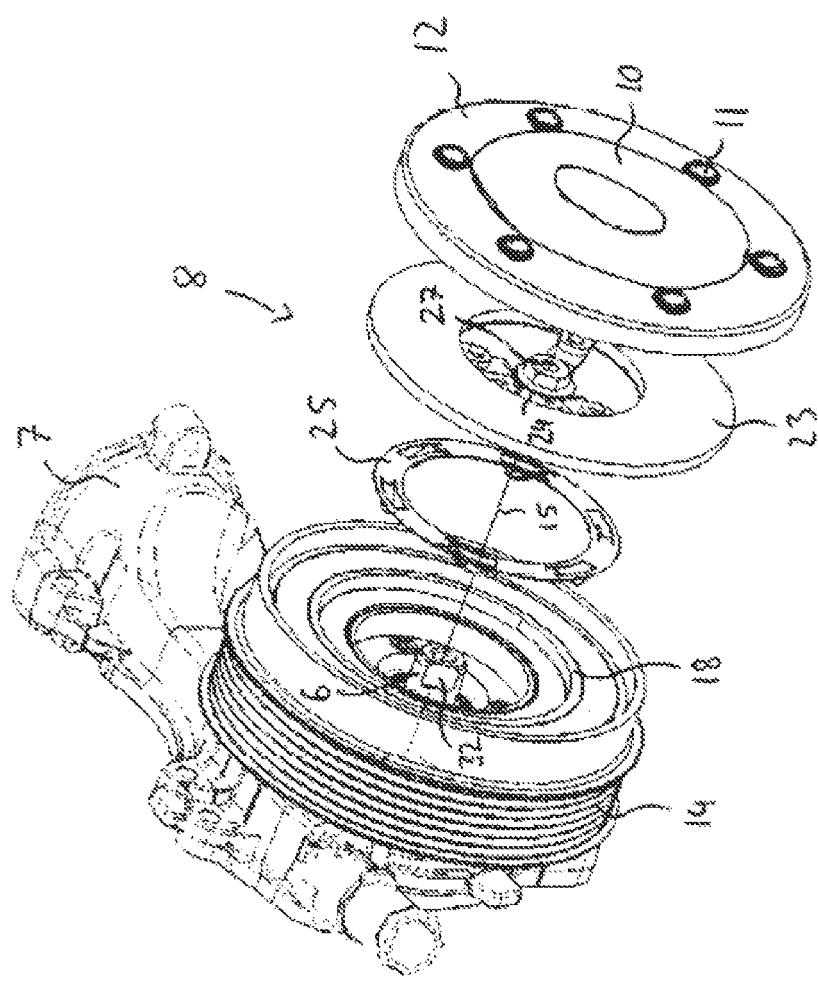
FIG. 3 is schematically shows an exploded view of the belt drive arrangement according to FIG. 2.

FIG. 3 shows the belt drive arrangement 8 according to FIG. 2 in an exploded view. In this representation, the concentric arrangement of the individual elements about the longitudinal axis 15 is noticeable in particular. Furthermore, the two-flat connection 32, on which the bushing 24 is in engagement with the shaft 6, is partially shown in FIG. 3.

The belt drive arrangement 8 is constructed so that assembly tolerances of the overall construction can be left out of consideration when calculating the switching gap 30. It is therefore possible to determine the switching gap as precisely as possible even before the assembly and to match the preloading force of the spring plate 25 accordingly.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A belt drive arrangement for an auxiliary unit of a motor vehicle, comprising
a drive element;
a belt pulley configured to receive the drive element;
a shaft of the auxiliary unit configured to be driven with a torque of the belt pulley;
a clutch device configured for a releasable torque transmission between the belt pulley and the shaft of the auxiliary unit,
wherein the clutch device comprises:
an electromagnet;
a spring element configured for a preloading force such that the clutch device is closed in a currentless state of the electromagnet; and
a fastening block connected to the auxiliary unit in a rotation-proof manner,
wherein the belt pulley and the spring element are rotatably mounted to the fastening block with a first bearing and a second bearing.

2. A belt drive arrangement for an auxiliary unit of a motor vehicle, comprising
a drive element;
a belt pulley configured to receive the drive element;
a shaft of the auxiliary unit configured to be driven with a torque of the belt pulley; and
a clutch device configured for a releasable torque transmission between the belt pulley and the shaft of the auxiliary unit,
wherein the clutch device comprises:
an electromagnet;
a spring element configured for a preloading force such that the clutch device is closed in a currentless state of the electromagnet, and
wherein the spring element is a spring plate concentrically arranged about the shaft.

3. A belt drive arrangement for an auxiliary unit of a motor vehicle, comprising
a drive element;
a belt pulley configured to receive the drive element;
a shaft of the auxiliary unit configured to be driven with a torque of the belt pulley; and
a clutch device configured for a releasable torque transmission between the belt pulley and the shaft of the auxiliary unit,
wherein the clutch device comprises:
an electromagnet;
a spring element configured for a preloading force such that the clutch device is closed in a currentless state of the electromagnet, and
wherein the clutch device further comprises a clutch plate that is concentrically arranged about the shaft.

4. The belt drive arrangement according to claim 3, wherein the clutch plate is arranged in an axial direction between the electromagnet and a friction surface connected to the belt pulley.

5. The belt drive arrangement according to claim 3, wherein a switching gap stands open between the electromagnet and the clutch plate in the currentless state of the electromagnet.

6. The belt drive arrangement according to claim 3, wherein the clutch plate with a clutch surface facing away from the electromagnet is pressed against a friction lining connected to the belt pulley through the preloading force of the spring element in the currentless state of the electromagnet.

7. The belt drive arrangement according to claim 3, further comprising a positive connection between the clutch plate and the shaft.

8. The belt drive arrangement according to claim 7, wherein the positive connection is a flattened region of the shaft and a corresponding flattened region of a bushing connected to the clutch plate that encloses the shaft.

9. A belt drive arrangement for an auxiliary unit of a motor vehicle, comprising
a drive element;
a belt pulley configured to receive the drive element;
a shaft of the auxiliary unit configured to be driven with a torque of the belt pulley;
a clutch device configured for a releasable torque transmission between the belt pulley and the shaft of the auxiliary unit,
wherein the clutch device comprises:
an electromagnet;
a spring element configured for a preloading force such that the clutch device is closed in a currentless state of the electromagnet; and
a central screw that secures the clutch device on an end of the shaft.

10. A motor vehicle, comprising:
a drive;
a crankshaft of the drive; and
a belt drive arrangement comprising:
a drive element;
a belt pulley that is configured to receive the drive element;
a shaft of an auxiliary unit configured to be driven with a torque of the belt pulley; and
a clutch device configured for a releasable torque transmission between the belt pulley and the shaft of the auxiliary unit,
wherein the clutch device comprises:
an electromagnet; and
a spring element configured for preloading such that the clutch device is closed in a currentless state of the electromagnet,
wherein the belt pulley is connected to the crankshaft of the drive of the motor vehicle through the drive element; and
a fastening block connected to the auxiliary unit in a rotation-proof manner,
wherein the belt pulley and the spring element are rotatable mounted to the fastening block with a first bearing and a second bearing.

11. The motor vehicle according to claim 10, wherein the auxiliary unit is a coolant pump.

12. The motor vehicle according to claim 10, wherein the auxiliary unit is an air-conditioning compressor.

13. The motor vehicle according to claim 10, wherein the auxiliary unit is an electric generator.

* * * * *